United States Patent [19]

Weinberger et al.

[11] 4,209,668
[45] Jun. 24, 1980

[54] TELEPHONE HAVING REITERATIVE DIALING FEATURE

[75] Inventors: Gerald J. Weinberger, Smithtown; Stanley F. Miller, Rocky Point, both of N.Y.

[73] Assignee: Utility Verification Corp., Commack, N.Y.

[21] Appl. No.: 944,183

[22] Filed: Sep. 20, 1978

[51] Int. Cl.² ............................................. H04M 1/272
[52] U.S. Cl. .............................. 179/90 B; 179/90 BD
[58] Field of Search ............. 179/90 B, 90 BB, 2 DP, 179/5 R, 90 BD, 18 DA, 90 D, 2 A

[56] References Cited

U.S. PATENT DOCUMENTS

| | | | |
|---|---|---|---|
| 3,792,203 | 2/1974 | Martin | 179/90 B |
| 3,868,479 | 2/1975 | Schweitzer et al. | 179/5 R |
| 3,885,108 | 5/1975 | Zock | 179/90 B |
| 3,899,640 | 8/1975 | Piacente et al. | 179/18 DA |
| 4,052,570 | 10/1977 | Sutton | 179/90 B |

*Primary Examiner*—Gerald Brigance
*Attorney, Agent, or Firm*—Arthur L. Lessler

[57] ABSTRACT

A telephone having a dialer for repetitively dialing a desired number at 40 second time intervals. The telephone is initially used in the normal manner, and when the number being called is busy, the user hangs up the telephone and depresses a button to place it in a reiterative dialing mode. Thereafter the telephone, at 40 second intervals, repetitively dials the desired number. Each time a busy signal is detected the telephone disconnects from the line, and dials again 40 seconds later. When a ring signal is detected, indicating the number called is no longer busy, an alarm alerts the user to pick up the receiver. All of the logic and control circuitry involved, except the power supply, is built into the telephone.

10 Claims, 4 Drawing Figures

(SHEET 1)

(SHEET 2)

(SHEET 1)

(SHEET 2)

TELEPHONE HAVING REITERATIVE DIALING FEATURE

This application relates to a telephone having a reiterative dialing feature.

Telephones which have a retro-dialing feature are known in the art. In these telephones one or more desired telephone numbers are electronically stored in registers, and a desired telephone number can be dialed merely by pressing a button corresponding to the register containing the desired number.

Although these retro-dialing telephones save the time involved in manually dialing a number, they still require the user to press the dial button at repeated intervals when the number being called is busy, thus diverting the user from other work.

Accordingly, an object of the present invention is to provide a telephone having a reiterative dialing feature which eliminates the need for repeatedly dialing a telephone number which is busy at the time it is initially dialed.

As herein discribed, there is provided in a telephone having a microphone and a receiver, reiterative dialing means comprising: electrically actuable line seizing means; electrically actuable dialing means including a called number storage register for dialing a desired telephone number; means for detecting signals on the telephone line and generating (i) a busy signal when a periodic busy tone appears on the telephone line, and (ii) a ring signal when a periodic ring tone appears on the telephone line; trigger means responsive to a reiterative mode signal for periodically and repetively enabling said line seizing means and actuating said dialing means; means responsive to said busy signal for dialing said line seizing means; and means responsive to said ring signal for generating an alarm signal.

Figure 1:
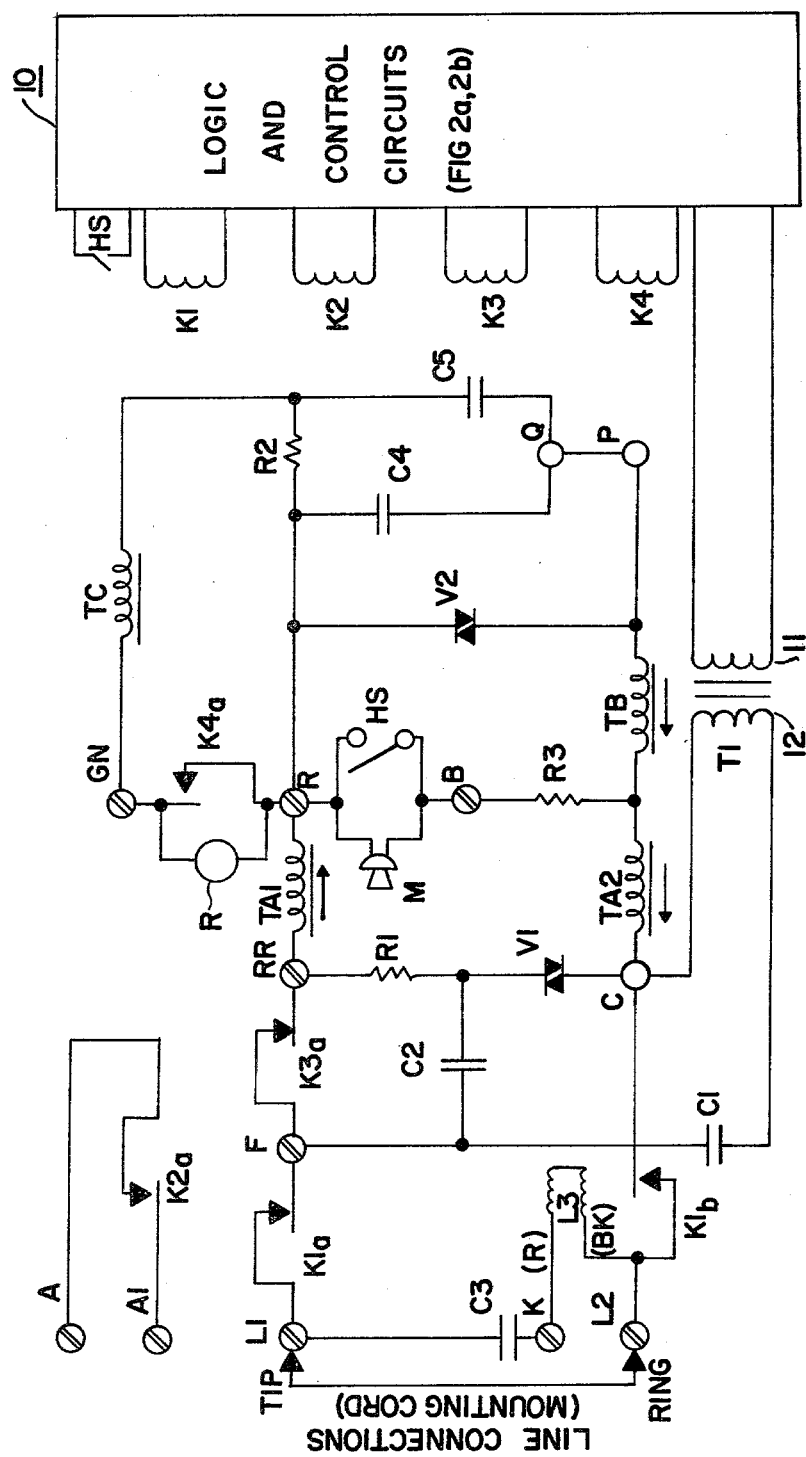
FIG. 1 is a circuit diagram of a telephone having a reiterative dialing feature according to a preferred embodiment of the present invention.
Figure 2A:
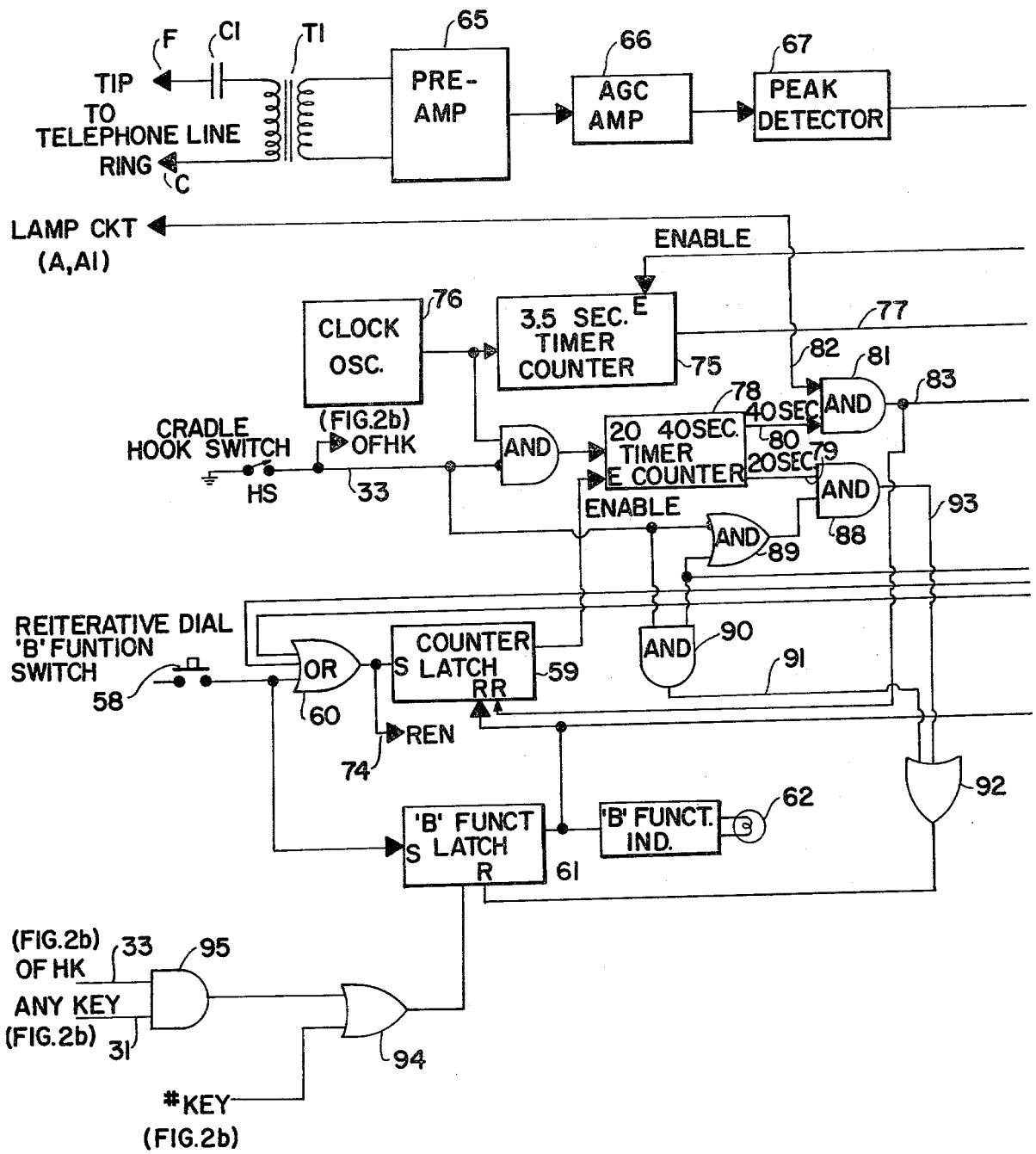
FIG. 2a is a functional block diagram showing the logic and control circuitry which provides the reiterative control function of the telephone shown in FIG. 1.
Figure 2A:
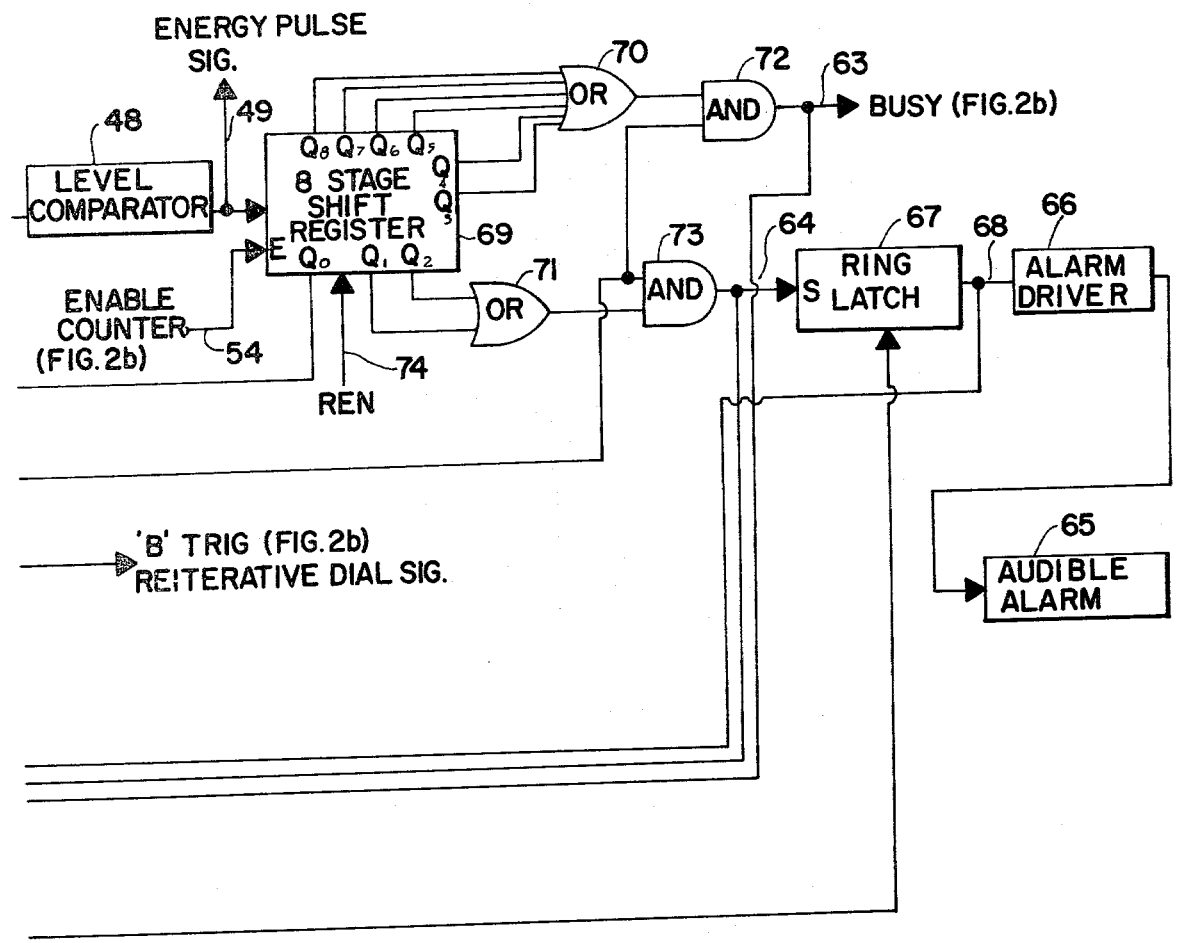
Figure 2B:
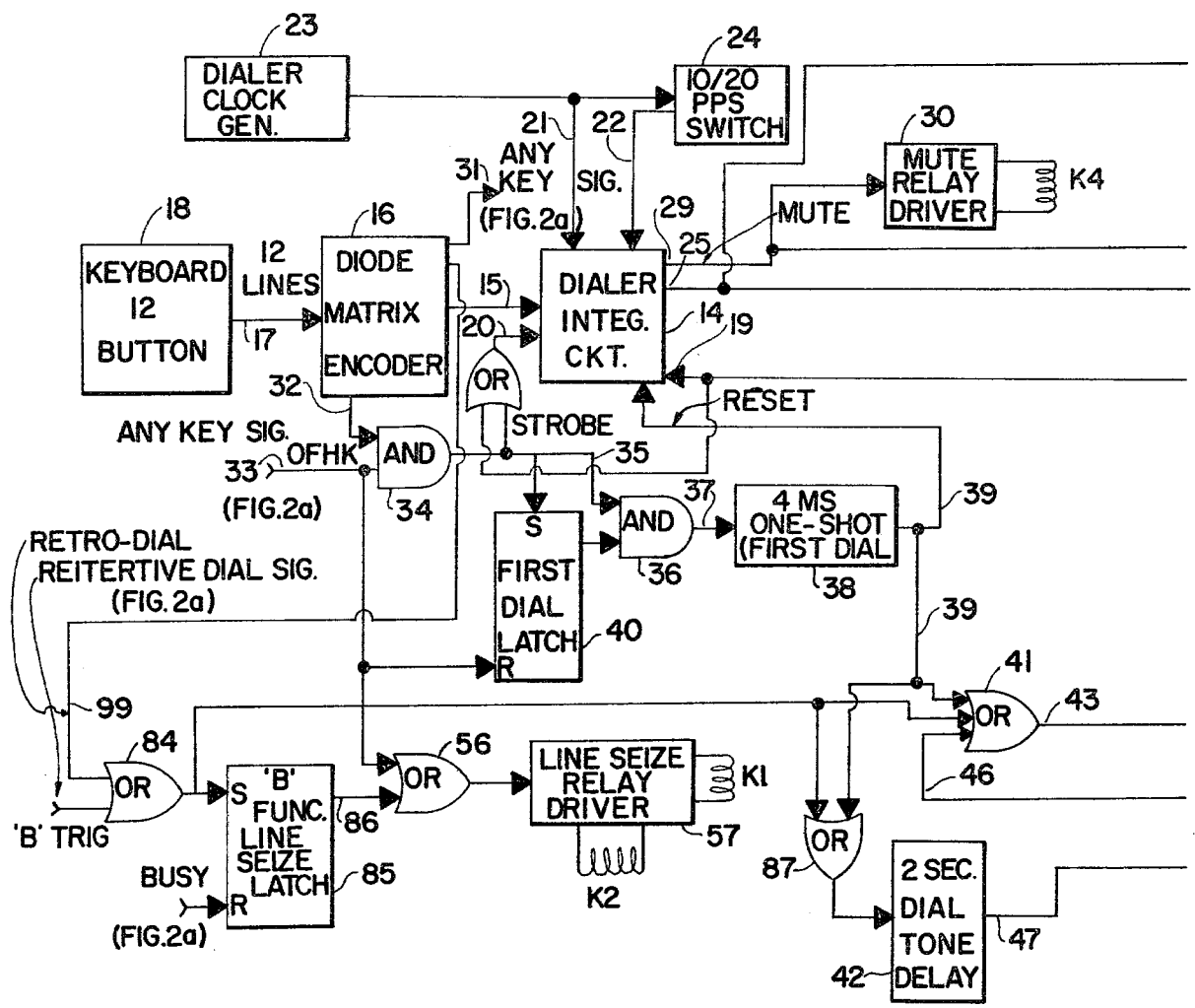
FIG. 2b is a functional block diagram showing the line seizing and dialing means of the telephone shown in FIG. 1.
Figure 2B:
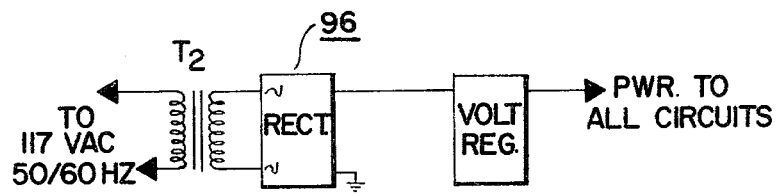
Figure 2B:
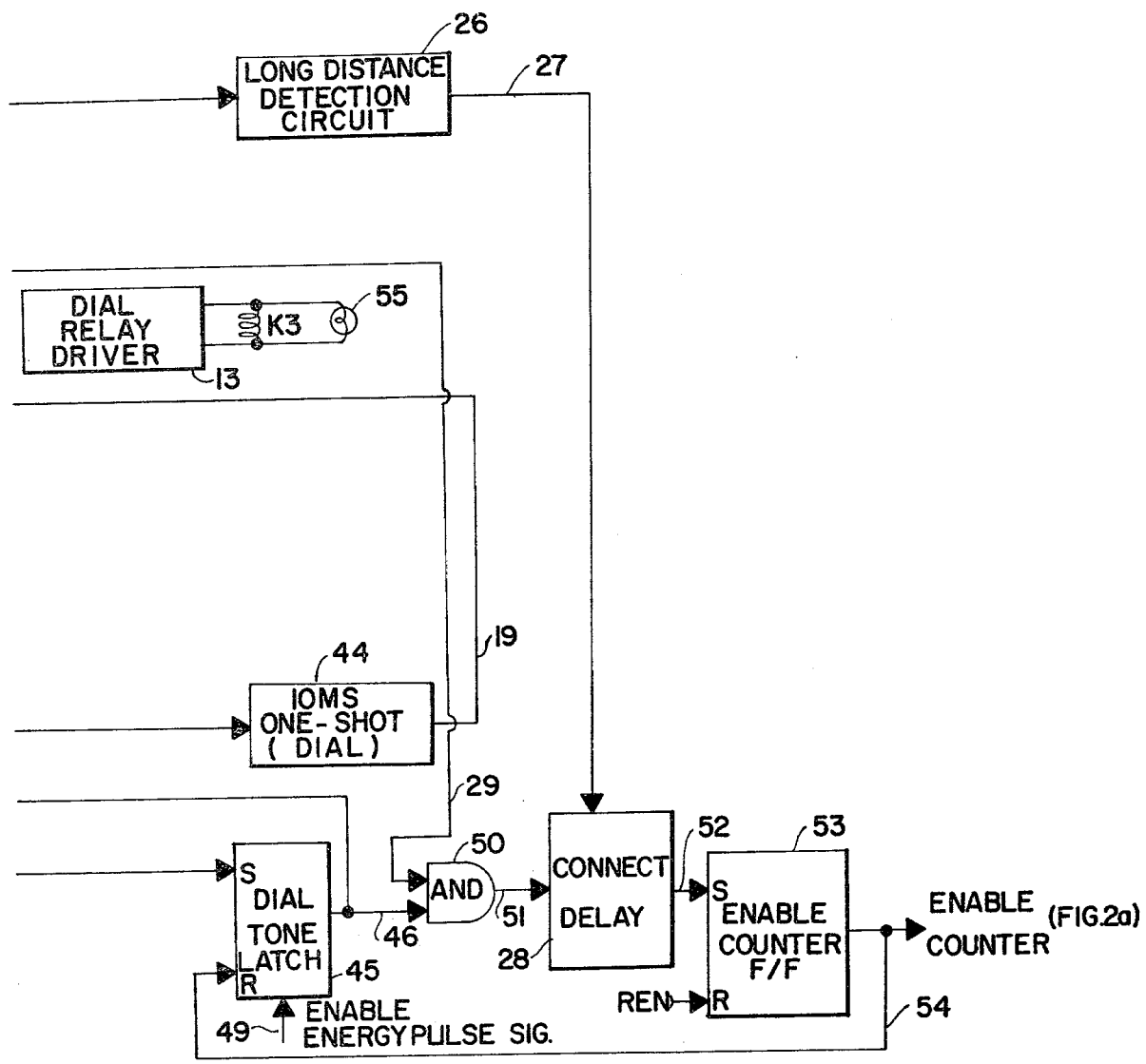
Figure 2B:
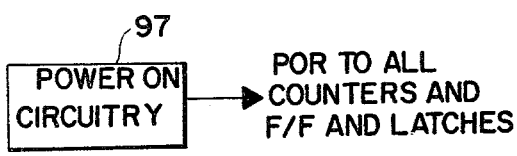

The reiterative dialing telephone herein described is shown in FIG. 1, in which the circuitry which performs normal telephone functions is shown, as well as the relays K1 to K4 and their associated contacts, which are operated by the logic and control circuitry shown in FIGS. 2a and 2b to provide the reiterative dialing function of the invention.

By the term "retro-dialing" as herein employed is meant an arrangement which automatically dials a desired telephone number when a switch or button is manually depressed. By the term "reiterative dialing" as herein employed is meant the arrangement herein described, in which a desired telephone number is periodically and repetitively automatically dialed at predetermined intervals, with the process continuing each time the line called is busy, and the user being alerted to pick up the receiver when the line being called is ringing.

While the telephone herein described has both reiterative dialing and retro-dialing capabilities, the invention claimed relates only to the reiterative features.

As shown in FIG. 1, the telephone is adapted for connection to a standard telephone system via terminals A, A1, L1, K, and L2; L1 and L2 comprising the conventional "tip" and "ring" connections.

The relay K1 is actuated to "seize" the telephone line, i.e. connect the telephone thereto, whenever (i) the hook switch HS is in its off-hook position, or (ii) a desired telephone number is to be reiteratively dialed or retro-dialed. Line seizure is provided via the relay contacts K1a and K1b. The relay contact K2a interconnects terminals A and A1 to provide an indication to other telephones on the same local line that the telephone of FIG. 1 is in use. This indication is normally provided by illuminating a light on each of the other telephones.

Once the telephone line has been seized via relay contacts K1a and K1b, dialing is accomplished by alternate opening and closing of relay contact K3a, which is connected between the tip and ring terminals L1 and L2 through a series resistor R1 and varistor V1, with a radio frequency noise suppression capacitor C2 connected across the series combination of contact K3a and resistor R1.

Suppression of line transients is provided by the series combination of capacitor C3 and RF choke L3. Anti-sidetone circuitry and conjugate coupling of the transmitter microphone M and receiver R, are provided by a hybrid transformer comprising windings TA1, TA2, TB and TC. Proper sidetone amplitude and impedance balancing are provided by resistor R2, capacitors C4 and C5, and varistor V2. Current through the carbon granule microphone M is limited to the proper range by series resistor R3.

One set of contacts of the hook switch HS short-circuits the microphone M when the telephone is in on-hook condition. Another set of contacts of the hook switch HS is coupled to the logic and control circuitry 10, shown in detail in FIGS. 2a and 2b.

The logic and control circuitry 10 has outputs for driving the relays K1 to K4, and an input for sensing signals on the telephone line, coupled to the secondary winding 11 of transformer T1, the primary winding 12 of said transformer being coupled to the tip and ring terminals L1 and L2 through a DC blocking capacitor C1, and the line seizure relay contacts K1a and K1b.

Relay contact K4a is coupled across receiver R, to provide muting of the receiver during dialing.

All dialing, i.e. manual dialing, reiterative dialing and retro-dialing, is done by applying drive pulses to the relay K3 to rapidly open and close the relay contacts K3a, at a rate of either 10 or 20 pulses per second. As illustrated in FIG. 2B, the relay drive pulses are supplied by a dial relay driver circuit 13 which in turn receives control signals from a dialer integrated circuit 14.

The dialer integrated circuit 14 is a standard part available from several manufacturers. A suitable dialer integrated circuit for this purpose is available from General Instrument Corporation, Micro Electronics Div., Hicksville, N.Y., under the part designation AY-5-9100.

The performance, manner of utilization and equivalent block diagram of this integrated circuit is described in the following literature: "Pushbutton telephone dialer circuit", AY-5-9100, May, 1974, published by General Instrument Corporation, Micro Electronics Division.

The dialer integrated circuit 14 contains an internal storage register for storing the digits (including the three area code digits) of the telephone number which is to be dialed. These digits are fed to the dialer integrated circuit 14 in serial fashion, in binary coded decimal form, on four input lines 15 from the diode matrix encoder 16, which in turn receives key depression input signals on 12 lines 17 from the 12 key pushbutton keyboard 18.

When enabled by two successive pulse signals on lines 19 and 20, the dialer integrated circuit 14 proceeds to generate a group of output pulses to the dial relay driver 13, at a rate determined by clock pulses received on lines 21 and 22 from the dialer clock generator 23. A dial rate switch 24 selectively couples clock or a D.C. voltage to line 22, while clock pulses are provided on Line 21.

The output of the dialer integrated circuit 14 to the relay driver 13 is a group of pulses, at a rate of 10 or 20 per second, corresponding in number to the numerical value of the corresponding depressed key of the keyboard 18. For example, when the key corresponding to the numeral "8" is depressed, the output of the dialer integrated circuit 14 comprises a group of 8 pulses, having their leading edges spaced apart by 50 or 100 milliseconds, depending upon the position of the switch 24. The integrated circuit 14 generates groups of pulses to the driver 13 from information stored in its internal register, with the time spacing between pulse groups being in the range of 350 to 700 milliseconds.

The dialing pulses coupled to the relay driver 13 via line 25, are also coupled to a long distance detection circuit 26, which determines the numerical value of the second dialed digit. If said second digit is a "zero" or a "one" corresponding to a long distance call, a corresponding output signal is generated on line 27 to control the time delay introduced by the connect delay circuit 28. In the United States, the second digit of the area code used for long distance telephone calls, is always a "zero" or "one".

While the dialer integrated circuit 14 is providing dial signals on line 25 to the relay driver 13, it also provides a signal on line 29 which is high when dialing is in progress. This signal is coupled to the mute relay driver 30, which actuates relay K4 to (via relay contacts K4a) mute the receiver R (see FIG. 1).

Whenever any key of the 12 key keyboard 18 is depressed, a corresponding "any key" signal is provided by the diode matrix encoder 16 on lines 31 and 32. An "off-hook" signal is provided to the logic circuitry shown in FIGS. 2a and 2b via the hook switch HS (FIG. 1), on line 33.

Whenever the telephone receiver is off-hook and any key of the keyboard is depressed, e.g. to initiate dialing a new number, the dialer integrated circuit 14 is reset. This is accomplished via the AND gate 34, the output of which (on line 35) goes high when the receiver is off hook and any key of the keyboard is depressed; AND gate 36, the output of which (on line 37) also goes high; and monostable multivibrator 38, which then generates a four millisecond reset pulse to the dialer integrated circuit 14 on line 39. When the telephone receiver is placed back on its hook, the latch circuit 40 is reset, preventing undesired resetting of the dialer integrated circuit 14 until the receiver is once again removed from its hook.

The reset signal on line 39 is also coupled to a OR gate 41 and a two second dial tone delay circuit 42. The output of the OR gate 41 on line 43 causes the monostable multivibrator 44 to generate a 10 millisecond dial pulse to the dialer integrated circuit 14 on line 19. However, the construction of the dialer integrated circuit 14 is such that it will not commence dialing, i.e. generating pulse signals to the relay driver 13 on line 25, until a second 10 millisecond pulse is received.

This second pulse is provided via the dial tone latch circuit 45, which generates an output pulse to the OR gate 41 on line 46 when the latch is set by the delayed output of the delay circuit 42 on line 47, provided that the latch 45 has been enabled by an energy pulse signal from the level comparator 48 (FIG. 2a) on line 49. The enable signal is provided to the latch 45 on line 49 when an energy pulse, in this case indicative of the presence of a dial tone on the telephone line, is provided on line 49.

Thus a second pulse is generated by the multivibrator 44 only if the presence of a dial tone is sensed within two seconds after the first dial pulse is generated by the multivibrator 44. Upon receipt of the second dial pulse from the multivibrator 44, the dialer integrated circuit 14 commences the dialing operation, i.e. generation of dialing pulses to the relay driver 13 on line 25.

Both the output of the latch 45, on line 46, and the "dialing in progress" signal from the dialer integrated circuit 14 on line 29, are coupled to an AND gate 50, the output of which, on line 51, provides an "end of dialing" signal, which in turn is coupled to the connect delay circuit 28.

Although the connected delay circuit 28 functions in the manual dialing mode as well as the reiterative dialing and retro-dialing modes, the primary purpose of this delay is to facilitate operation in the reiterative dialing mode by causing the circuitry which detects whether the number being called is a busy or is ringing, to "wait" until transients on the telephone line which might disrupt circuit operation, have dissipated. Since the duration of these transients is longer when a long distance call is made than when a non-long distance call is made, the delay introduced by the connect delay circuit 28 is varied accordingly, utilizing the long distance signal on line 27 to control the amount of delay. For non-long distance calls the delays introduced by the connect delay circuit 28 is approximately 4 seconds, while for long distance calls said delay is approximately 7 seconds.

After the desired delay time has expired, the delay circuit 28 generates an output signal on line 52 which sets the enable counter flip-flop 53, causing the output of said flip-flop on line 54 to go high, and thus resetting the dial tone latch 45.

Thus, in the manual dialing mode, the telephone receiver is first removed from the hook, and dialing is commenced by pressing corresponding keys of the keyboard 18, resulting in resetting of the dialer integrated circuit 14 and subsequent coupling of coded signals to its internal storage register via the diode matrix encoder 16 on line 15.

Immediately thereafter, the dialer integrated circuit 14 commences generation of dialing pulses to the relay driver 13, which causes the relay K3 to be pulsed so that relay contacts K3a perform the desired dialing operation. A light emitting diode or lamp 55 is connected across the relay K3 and illuminates while dialing is in progress. After dialing is completed, the telephone functions in the same manner as a conventional telephone, if so desired.

Whenever the telephone receiver is removed from its hook, the corresponding off-hook signal on line 33 is coupled through OR gate 56 to the line seize relay driver circuit 57, to actuate relays K1 and K2, resulting in line seizure.

If the telephone number dialed is unavailable due to busy line, the central telephone network generates a "busy" pulsed tone, consisting of energy pulses at a rate such that, anywhere in the United States, at least 3 of such pulses occur within any given 3.5 second interval. When the telephone number called is available, however, the central telephone network generates a ring tone, which comprises energy pulses at a rate such that no more than 2 of such pulses occur in any given 3.5 second interval, throughout the United States. These facts are employed to enable the circuitry of the present invention to discriminate between busy tones and ring tones, as hereafter described.

After a desired telephone number has been dialed, the code signals corresponding to said number remain stored in the internal storage register of the dialer integrated circuit 14 (until said circuit is reset by a signal on line 39). If the calling party hears a busy signal, he returns the telephone receiver to its hook, and depresses the reiterative mode selector switch pushbutton 58 (FIG. 2a) to set the counter latch 59 via OR gate 60, and to also set the reiterative dialing or "B" function latch 61, and thus initiate the reiterative dialing sequence. As long as the reiterative dialing function latch 61 remains set, a light emitting diode or lamp 62 illuminates and remains illuminated to indicate that the telephone is in its reiterative dialing mode.

In the reiterative dialing mode, the dialer integrated circuit 14 is caused to redial the desired telephone number at 40 second intervals. If a busy signal is generated on line 63 (FIG. 2b) indicative of the presence of a "busy" pulse tone on the telephone line, the counter latch 59 (which had been reset when the desired telephone number was automatically dialed) is reset to continue the reiterative dialing sequence at 40 second intervals. If, however, a ring signal is generated on line 64, indicative of the presence of a ring tone on the telephone line, the calling party is alerted by the audible alarm 65 which is actuated by the alarm driver 66 when the ring latch 67 is set; and the latches 59 and 61 are reset 20 seconds thereafter, to terminate the reiterative dialing mode.

To detect the presence of busy and ring tones on the telephone line and generate corresponding busy and ring signals on lines 63 and 64, telephone line signals are coupled to a preamplifier 65 via capacitor C1 and transformer T1. The output of preamplifier 65 is coupled to an automatic gain controlled amplifier 66, to normalize the telephone line signals to a desired amplitude range, with the output of the amplifier 66 coupled to a peak detector 67 which generates corresponding output pulses to the level comparator 48.

The level comparator 48 compares the pulses from the peak detector 67 with a predetermined threshold value, and provides energy pulse signals on line 49 only for those pulses from the peak detector 67 having an amplitude exceeding said threshold value. Thus the energy pulse signals on line 49 correspond to dial tone, busy tone or ring tone signals, depending upon the operation of the central telephone network.

In the reiterative dialing mode, it is necessary to distinguish between energy pulse signals on line 49 corresponding to busy tone signals, and energy pulse signals on said line corresponding to ring tone signals. This is done, as previously described, by counting the number of pulse signals on line 49 which occur in a 3.5 second interval. The detection of one or two pulse signals in said interval corresponds to a ring tone signal, whereas the detection of three or more pulse signals within said 3.5 second time intervals corresponds to a busy tone signal. The telephone networks employed in the United States have parameters such that no busy tone signals produce more than 7 energy pulses in any given 3.5 second time interval.

The detection of busy and ring tone signals is accomplished by an eight stage shift register 69, OR gates 70 and 71, and AND gates 72 and 73.

Initially the shift register 69 is reset by a reset enable ("REN") signal from the OR gate 60 on line 74. The shift register 69 is also reset by this signal at the end of each reiterative dialing operation, as a result of detection of either a busy or ring tone signal. When reset, all of the output lines Q0 to Q8 of the shift register 69 are low.

When the shift register 69 is enabled, by an enable counter signal on line 54 from the enable counter flip-flop 53, the output signal on line Q0 goes high, enabling the 3.5 second timer counter 75, which begins counting clock pulses from the clock oscillator 76. At the end of the 3.5 second timing interval, the output of the counter 75 on line 77 goes high, providing corresponding high inputs to the AND gates 72 and 73.

Once the shift register 69 has been enabled by the signal on line 54, the next energy pulse signal coupled thereto on line 49 causes shift register output line Q1 to go high. Subsequent energy pulse signals cause output lines Q2, Q3, etc. to successively go high, with only one of the output lines Q1 to Q8 being high at a time.

At the end of the 3.5 second time interval, i.e. when the output of counter 75 on line 77 goes high, the particular output line of the shift register 69 which is then high indicates how many energy pulse signals have been received by the shift register 69 during said time interval. If one or two pulses have been received, line Q1 or Q2 will be high, the high signal being coupled thorugh OR gate 71 and AND gate 73 (since the signal on line 77 is also high at the end of the 3.5 second timing interval) to generate a corresponding ring detection signal on line 64.

If three or more energy pulse signals have been coupled to the shift register 69 during the 3.5 second time interval, one of the output lines Q3 to Q8 will be high, the high signal being coupled through OR gate 70 and AND gate 72 to produce a busy detect signal on line 63.

Thus the overall operation of the telephone in its reiterative dialing mode is as follows:

When the reiterative dial mode selector button 58 is depressed, latches 59 and 61 are set. Latch 61 when set causes the indicator lamp 62 to illuminate, indicating that the telephone is in its reiterative dialing mode. The output of counter latch 59 enables a 20/40 second timer counter 78 to begin counting clock pulses from the clock oscillator 76 (only when the hook switch HS is in its on-hook position).

The timer counter 78 generates an output pulse on line 79 approximately (with a tolerance equal to the time between pulses generated by the clock oscillator 76) 20 seconds after it has been enabled, and at 20 second intervals thereafter as long as the timer counter 78 remains enabled. Approximately 40 seconds after it has been enabled, and at 40 second intervals thereafter so long as the timer counter 78 remains enabled, output pulses are provided on line 80 to the AND gate 81. If desired, the timer counter 78 may have counts of more or less than the aforementioned 20 and 40 second intervals.

Forty seconds after the reiterative dial mode selection button 58 has been depressed, an output pulse from the timer counter 78 appears on line 80. If at this time the lamp circuit signal on line 82 is high, corresponding to the availability of the telephone line (i.e. the line not being in use by the other local telephones), the output of AND gate 81 on line 83 goes high, resetting the counter latch 59 and causing the output of OR gate 84 (FIG. 2b) to go high.

When the output of OR gate 84 goes high, the line seize latch circuit 85 is set, causing its output on line 86 to go high and, via OR gate 56, cause the line seize relay driver 57 to actuate line seize relays K1 and K2, thus coupling the dial circuitry to the telephone line.

When the output of OR gate 84 goes high, it initiates a dialing operation, via OR gates 41 and 87, in substantially the same manner that dialing is initiated by the signal on line 39 in the manual mode (except that in the reiterative dialing mode the dialer integrated circuit 14 is not reset).

The dial circuitry then causes the relay contacts K3a to dial the desired telephone number stored in the register of the dialer integrated circuit 14.

Four seconds after dialing has been completed (or 7 seconds if a long distance call has been dialed), the enable counter flip-flop 53 is set, causing its output on line 54 to go high and to enable the shift register 69.

The shift register 69 then begins to operate as previously described, in conjunction with the telephone line signal processing circuits 65, 66, 67 and 48, OR gates 70 and 71, timer counter 75 and AND gates 72 and 73, to detect whether a busy or ring tone has been generated by the central telephone network.

If a ring signal is generated on line 64, indicating that the telephone call is ringing through to the called party, the counter latch 59 is set, via OR gate 60, and the ring latch 67 is also set, providing a corresponding high input to AND gate 88 via AND gate 89. The high signal on line 68 causes the alarm driver 66 to drive the audible alarm 65.

If, after the ring signal is generated on line 64, the user removes the telephone receiver from its hook, the output of AND gate 90 on line 91 goes high, resetting the latches 59, 61 and 67, via OR gate 92, and effectively terminating the reiterative dialing sequence.

If, however, the ring signal on line 64 has been generated and the audible alarm 65 has been permitted to sound for a period of 20 seconds without the receiver being removed from the hook, the output of AND gate 89 remains high, causing AND gate 88 to generate an output signal on line 93 at the end of said 20 second interval, thus resetting the latches 59, 61 and 67 and terminating the reiterative dialing sequence.

Thus the reiterative dialing sequence is automatically terminated when the circuitry determines that the telephone of the called party is ringing and (i) the calling party or user removes the telephone from its hook, thus actuating hook switch HS to its off-hook position, or (ii) 20 seconds has elapsed after detection of the ring signal, without the telephone receiver of the user having been removed from its hook.

If a busy signal is generated on line 63 after the desired telephone number has been automatically dialed in response to the reiterative dial signal on line 83 (40 seconds after inititation of the reiterative dialing mode), the counter latch 59 is set again, via OR gate 60, thus enabling the timer counter 78, and the reiterative dialing operation is repeated 40 seconds later. Reiterative dialing is thus periodically and repetitively performed, at 40 second intervals, until a ring signal appears on line 64, indicating that the telephone of the called party is ringing.

The reiterative dialing mode may be terminated at any time by the user, by pressing the # key of the keyboard 18, thus providing a reset signal to the latches 59, 61 and 67 via OR gate 94. The reiterative dialing operation is also automatically terminated when the receiver is removed from its hook and any key is depressed, by means of a reset signal coupled to said latches via AND gate 95 and OR gate 94.

As shown in FIG. 2B, power is supplied to the control and logic circuitry by a power supply indicated generally at 96, and power-on reset circuitry 97 initially sets all counters, flip-flops and latches to their proper initial positions when power is turned on. Such circuitry is well known in the art and therefore not described in further detail in this application.

Figure 3:
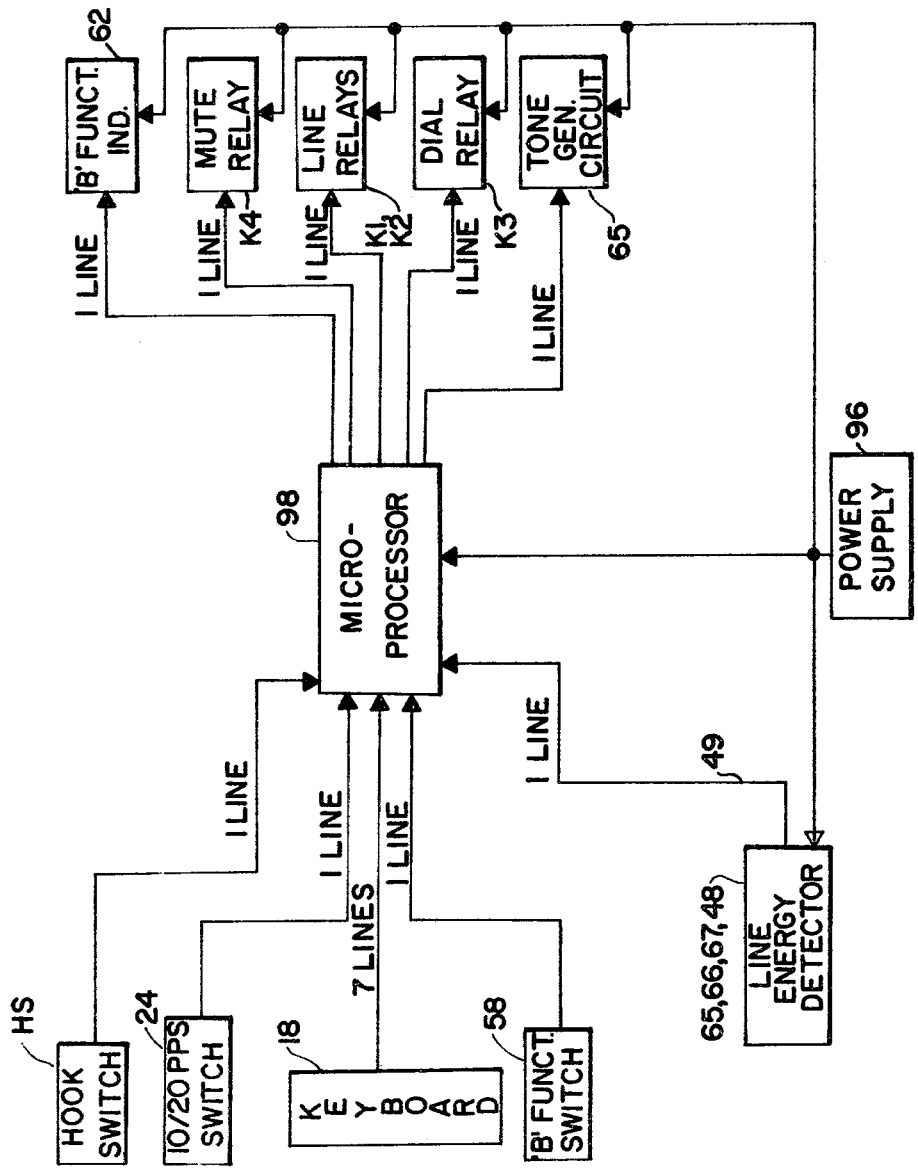
FIG. 3 is a block diagram illustrating an alternative embodiment of the invention utilizing a micro-processor as the logic control element.

The control and logic circuitry shown in FIGS. 2a and 2b may be implemented, if desired, by means of a micro-processor programmed to provide the required functions described above. A suitable arrangement for this purpose, utilizing a micro-processor 98, is illustrated in FIG. 3. The necessary software for providing the control and logic functions previously described will be clear to one's skilled in the programming art, and is therefore not described in detail here. The microprocessor 98 may, e.g., comprise type MM76 manufactured by Rockwell International Corporation, Micro-Electronic Devices Division, Anaheim, California, or any other suitable commercially available microprocessor.

By depressing the * key of the keyboard 18, the telephone number which has been stored within the register of the dialer integrated circuit 14 may be retro-dialed. When the * key is depressed, a corresponding signal is provided by the diode matrix decoder 16 on line 99 to the OR gate 84, setting the line seize latch 85 and providing a corresponding signal to OR gates 41 and 87, so that the stored telephone number is dialed in the same manner as in the manual dial mode previously described.

The shift register 69, timer counter 75, and associated gates may be modified to utilize a time interval of 3.5 seconds plus any integral multiple of 6 seconds (i.e. 6n+3.5, where 0≦n), with the threshold count at which a busy tone (as opposed to a ring tone) is detected being twice the value of 1 plus said integer. The six second cycle corresponds to that of the ring tone, which has a cycle of 2 seconds on followed by 4 seconds off.

We claim:

1. In a telephone having a microphone, a receiver and a hook switch, reiterative dialing means comprising:
   electrically actuable line seizing means;
   electrically actuable dialing means including a called number storage register for dialing a desired telephone number;

means comprising an automatic gain controlled amplifier, a peak detector and a level comparator for generating energy pulse signals in response to telephone line signals having an amplitude exceeding a predetermined threshold value;

means for counting the number of said energy pulse signals occurring in a given time interval and for generating (i) a busy detected signal when said number exceeds a specified value and (ii) a ring detected signal when said number is at least one and no greater than said specified value, said counting means comprising:

a multistage shift register having an input terminal, an enable terminal, a reset terminal, at least two lower order output terminals, and a plurality of higher order output terminals;

means for coupling said energy pulse signals to said shift register input terminal;

means for applying a reset signal to said shift register reset terminal upon generation of any one of said busy detected and ring detected signals, and upon generation of a reiterative mode signal;

means for providing an enable signal to said shift register enable terminal a predetermined time period after said dialing means has dialed said desired telephone number;

a first OR gate coupled to said lower order output terminals of said shift register;

a second OR gate coupled to said higher order output terminals of said shift register; and timing means coupled to the lowest order output terminal of said shift register for enabling the outputs of said first and second OR gates to be coupled to terminals for said ring detected and busy detected signals respectively, for said given time interval, when a signal appears at said lowest order output terminal of said shift register;

trigger means responsive to said reiterative mode signal for periodically and repetitively enabling said line seizing means and actuating said dialing means;

means responsive to said busy detected signal for disabling said line seizing means; and means responsive to said ring detected signal for generating an alarm signal.

2. The reiterative dialing means according to claim 1, further comprising means for disabling said trigger means (i) a fixed time interval after occurrence of said ring detected signal, and (ii) upon initiation of the dialing of a telephone number via said telephone.

3. The reiterative dialing means according to claim 2, further comprising manually operable switch means for disabling said trigger means.

4. The reiterative dialing means according to claim 1, further comprising means responsive to at least one of said energy pulse signals for generating a dial tone detected signal to enable said trigger means.

5. The reiterative dialing means according to claim 1, further comprising means for muting said receiver while said dialing means is dialing said desired number.

6. The reiterative dialing means according to claim 1, further comprising means for short-circuiting said microphone when said hook switch is in on-hook position.

7. The reiterative dialing means according to claim 1, further comprising means for indicating when said reiterative mode signal has been received.

8. The reiterative dialing means according to claim 1, further comprising means for indicating when said dialing means is dialing said desired number.

9. The reiterative dialing means according to claim 1, further comprising decoding means operatively associated with said telephone for generating a long distance signal when said desired telephone number has an area code associated therewith, and means for varying said predetermined time period in response to said long distance signal.

10. The reiterative dialing means according to claim 1, wherein said given time interval is $6n+3.5$ seconds, where n is an integer greater or equal to 0, and said specified value is $2(n+1)$.

* * * * *